United States Patent
Kim et al.

(10) Patent No.: US 8,989,269 B2
(45) Date of Patent: Mar. 24, 2015

(54) MOTION VECTOR EXTRACTION METHOD AND APPARATUS

(75) Inventors: Ig Kyun Kim, Daejeon (KR); Kyoung Seon Shin, Daejeon (KR); Nak Woong Eum, Daejeon (KR); Hee-Bum Jung, Daejeon (KR)

(73) Assignee: Intellectual Discovery Co., Ltd., Seoul (KR)

( * ) Notice: Subject to any disclaimer, the term of this patent is extended or adjusted under 35 U.S.C. 154(b) by 766 days.

(21) Appl. No.: 13/325,044

(22) Filed: Dec. 13, 2011

(65) Prior Publication Data

US 2012/0147962 A1  Jun. 14, 2012

(30) Foreign Application Priority Data

Dec. 14, 2010 (KR) .................. 10-2010-0127579

(51) Int. Cl.
 *H04N 7/12*   (2006.01)
 *H04N 19/557* (2014.01)
 *H04N 19/56*  (2014.01)
 *H04N 19/61*  (2014.01)
 *H04N 19/53*  (2014.01)
 *H04N 19/533* (2014.01)

(52) U.S. Cl.
 CPC .............. *H04N 19/557* (2014.01); *H04N 19/56* (2014.01); *H04N 19/61* (2014.01); *H04N 19/53* (2014.01); *H04N 19/533* (2014.01)
 USPC ............ 375/240.16; 375/240.12; 375/240.21; 375/240.24; 348/402.1; 348/413.1; 348/427.1

(58) Field of Classification Search
 CPC ..... H04N 19/61; H04N 19/51; H04N 19/557; H04N 19/13; H04N 19/615; H04N 19/63; H04N 19/124; H04N 5/2355; H04N 19/006; H04N 19/00654; H04N 19/0066; H04N 19/00781; H04N 19/0003; H04N 19/00151; H04N 19/00278; H04N 19/00569; H04N 19/00606; H04N 19/00672; H04N 19/00696; H04N 19/00715; H04N 19/00951
 USPC .......... 375/240.01–240.29; 348/394.1, 405.1, 348/407.1, 413.1, 415.1, 427.1
 See application file for complete search history.

(56) References Cited

U.S. PATENT DOCUMENTS

| | | | |
|---|---|---|---|
| 6,947,603 B2 * | 9/2005 | Kim | 382/236 |
| 6,970,591 B1 * | 11/2005 | Lyons et al. | 382/154 |
| 8,155,195 B2 * | 4/2012 | Regunathan et al. | 375/240.16 |
| 2002/0172287 A1 * | 11/2002 | Kim | 375/240.16 |

(Continued)

FOREIGN PATENT DOCUMENTS

KR    2010-0013139 A    2/2010

OTHER PUBLICATIONS

Seiichiro Hiratsuka et al., "Ultra-Low Computational Complexity Algorithm of Motion Estimation Using Adaptive Sub-Sampling and Predictive Early Termination" IEICE transactions on information and systems (Japanese edition) D, vol. J91-D, No. 8, pp. 2080-2088, Aug. 2008.

*Primary Examiner* — Sath V Perungavoor
*Assistant Examiner* — Nathnael Aynalem
(74) *Attorney, Agent, or Firm* — Rabin & Berdo, P.C.

(57) ABSTRACT

A motion vector extraction method includes: deciding on a search start position in an original video and performing a spiral motion search; and determining whether or not to perform a search in a sub-sampling video, during P picture search.

6 Claims, 2 Drawing Sheets

(56) References Cited

U.S. PATENT DOCUMENTS

| | | | |
|---|---|---|---|
| 2004/0114688 A1* | 6/2004 | Kang | 375/240.12 |
| 2006/0039470 A1 | 2/2006 | Kim et al. | |
| 2008/0205526 A1* | 8/2008 | Kang | 375/240.16 |
| 2009/0323808 A1* | 12/2009 | Lin | 375/240.16 |
| 2010/0020878 A1* | 1/2010 | Liang et al. | 375/240.16 |
| 2011/0069751 A1* | 3/2011 | Budagavi | 375/240.02 |

\* cited by examiner

MOTION VECTOR EXTRACTION METHOD AND APPARATUS

CROSS-REFERENCES TO RELATED APPLICATIONS

The present application claims priority under 35 U.S.C 119(a) to Korean Application No. 10-2010-0127579, filed on Dec. 14, 2010 in the Korean intellectual property Office, which is incorporated herein by reference in its entirety set forth in full.

BACKGROUND

Exemplary embodiments of the present invention relate to a method and apparatus for effectively extracting a motion vector during a motion search.

Recently, the digitalization and utilization of videos have been rapidly accomplished. Furthermore, TV broadcasting has been digitalized, and domestic appliances such as DVD recorders or digital video cameras have widely spread. Furthermore, the video distribution on the Internet or the utilization of video mail, video phone, or video conference by mobile phones has also been accomplished.

Video coding technology is core technology for video digitalization. According to the advancement of technology represented by H.264 or demand for high resolution represented by HDTV, the computation amount of video coding is increasing day by day. In particular, the increase in computation amount of block matching, which occupies most of the computation amount, is becoming a serious problem.

Furthermore, a software encoder inevitably performs only imperfect block matching. Therefore, as the imperfect block matching becomes a main factor of the degradation of video quality, there is demand for the implementation of a high-efficiency search algorithm capable of reducing the computation amount and improving the accuracy of block matching.

As for the block matching, a variety of search methods have been proposed. However, a video quality of full search may be accomplished in a video in which block matching is easily performed, but image degradation of 1 dB or more may occur in some videos. This may serve as a large factor which degrades the video quality.

For example, since a spiral motion search method has a small computation amount, the spiral motion search method is mainly used as a search method of a software encoder. However, the spiral motion search method may significantly degrade the accuracy depending on videos. In the spiral motion search method, the computation amount is minimized by stopping a search according to a predetermined rule. However, this may have a bad effect. For example, when the search is trapped at a local optimal point, it may not approach an optimal point in a large area.

Furthermore, a multi-step search method has a disadvantage in terms of the reduction in computation amount, but an extreme degradation of accuracy does not occur. Therefore, the step search method is widely used as a search method of a hardware encoder. However, since the accuracy of each motion decreases, the accuracy of video in which most of motions are constant may be degraded in comparison with the spiral search method.

The motion search refers to a process of searching a coincident position within a reference video for each block of a coding target video. As an evaluation reference of coincidence, sum of absolute differences (SAD) is generally used. When it is assumed that a block within a coding target video is represented by B, a candidate vector is represented by v, a pixel value of a pixel existing at a position r within the coding target video is represented by $I_{cur}(r)$, and a pixel value of a pixel existing at a position r within the reference video is represented by $I_{ref}(r)$, the SAD for the candidate vector v in the block B is expressed as Equation (1) below.

$$SAD(B, v) = \sum_{r \in B} |I_{cur}(r) - I_{ref}(r + v)| \qquad \text{Eq. 1}$$

SADs (B,v) are calculated for several vectors, and a vector v at which the SAD (B,v) is minimized is finally decided as a motion vector.

The SAD has the largest efficiency as a comparison reference. However, the computation amount inevitably increases in the full search for evaluating the entire search points in the search range. Therefore, a variety of algorithms for reducing a computation amount, such as 3-step search, 4-step search, and diamond search, have been proposed.

In the spiral motion search method, a search is performed from an arbitrary point within a video toward the surroundings, and stopped at a point where a predetermined condition is satisfied. The spiral motion search method accurately estimates a search start position, which makes it possible to more efficiently perform a search. To decide a search start point, a variety of methods may be applied. For example, a vector calculated during a motion search may be referenced in a previous video, or a vector calculated from surrounding blocks may be referenced in a current block. Furthermore, referenced vectors may be combined. In addition, SAD may be calculated as a search stop rule according to the sequence, and a search may be stopped when the value decreases and then increases. This method searches only a specific region of a video, and may minimize the number of search points. However, when an estimation mistake occurs, an effect of reducing the degradation of video quality or the computation amount may not be sufficiently obtained.

In the multi-step search method, as a sub-sampling video is created for a video for calculating a motion, the resolution is decreased to reduce the number of search target points and the computation amount of block matching. A full search is performed in a video having the lowest resolution, and the search result is used to search a video having a higher resolution. Then, the resolution is gradually increased to finally calculate a motion vector in the original video. Therefore, this method is called a multi-step search method. In this method, since the number of search target points is decreased by reducing the resolution of the sub-sampling video, the computation amount is reduced at a predetermined rate regardless of the characteristic of the video, and the entire video is searched. Therefore, the video quality is not significantly degraded. Furthermore, since the resolution should be significantly reduced with the reduction of the computation amount, the amount of detailed video information decreases to thereby degrade the accuracy. In order to make up for such disadvantages, the following methods are proposed: a method of referring to a surrounding block search result, a method of performing filtering on a sub-sampling video, or a method of supplementing the decrease of detailed video information by expanding a template when calculating a motion vector.

In order to efficiently perform the spiral motion search on each of an original video and a sub-sampling video, the following methods are combined: (1) multi-stage search start point decision (2) double search range setting, and (3) adaptive stop condition decision.

The multi-stage search start point decision is performed as follows: several candidate vectors are set, SADs are calculated between a position indicated by each candidate vector and positions moved from the position by one pixel in the four directions, and a position at which the coincidence is the highest, that is, the SAD is the lowest is set to a search start position. At this time, the number of candidates may be increased to set the search start position to a more optimal position. However, when a large number of candidates are compared at once, the computation amount inevitably increases. Therefore, the overall candidates are not compared at once, but are divided into several groups and then compared.

First, the coincidence of a position indicated by each candidate in a first candidate group is calculated. When the highest coincidence is larger than a threshold value, a position at which the highest coincidence is obtained is set to a search start position. When the highest coincidence is smaller than the threshold value, the coincidence of a position indicated by each candidate in the next candidate group is calculated.

Until a candidate indicating a position where the coincidence is larger than the threshold voltage appears, the coincidence calculation is repeated for the overall candidates.

The group classification of the candidate vectors for deciding on a search start position is performed by sub-sampling video search, original video search with sub-sampling video search, and original video search without sub-sampling video search.

During the sub-sampling video search, candidates obtained by using spatial correlations of a video are divided into three groups. The divided three groups are set as the first, second, and third groups, and a predetermined position of the video is set to a fourth group.

During the original video search, when sub-sampling video search is previously performed, the search result is set to first and second groups, candidates obtained by using spatial correlations are set to a third group, candidates obtained by using temporal correlations are set to a fourth group, and a predetermined position of the video is set to a fifth group. Furthermore, when the sub-sampling video search is not performed, candidates obtained by using spatial correlations are set to a first group, candidates obtained by using temporal correlations are set to a second group, and a predetermined position of the video is set to a third group.

During the candidate extraction of each group, when the X and Y components of a newly-acquired candidate vector have a difference within three pixels from a previously-acquired candidate vector, the candidate is not added to the group.

When a stop condition is not properly set for the characteristic of the video, the search may be stopped before an optimal value is acquired, and thus the video quality may be significantly degraded. Furthermore, although an optimal value is passed, the search may be continued to significantly increase the computation amount. Therefore, a double search range may be set with the search start point as the center. In an internal small search range, the search is performed without a stop decision. Thus, the degradation of the video quality is prevented. Furthermore, in an external large search range, the search is performed with a stop decision. The large search range is set to be smaller than the original search range (full search range). Therefore, although the entire search range is searched without a stop decision, the increase of the computation amount is small. When the video is moved as a whole in a predetermined direction, it is highly likely that the search start position deviates from an estimated position. Therefore, a standard deviation of motion vectors obtained by the motion search is used as an indicator for deciding on a search range.

A stop condition using a threshold value is adopted as the stop condition. In this case, the search is stopped at a time point where a position having an SAD less than the threshold value appears. During the sub-sampling video search, a search is performed for 13 kinds of templates for one block. However, the maximum template (template obtained by combining four blocks) is used for the stop decision.

The threshold value for the search stop decision is decided based on the SAD when motion vectors are decided. The motion vectors serve as the base for candidate vectors used when deciding on the search start position. When the motion of a video is similar, the minimum SAD may be considered as a similar value, and a difference between the maximum SAD and the minimum SAD when the respective candidate vectors are decided is added as an allowance to the SAD when a candidate vector is decided as the search start position.

Although the SAD is not less than the threshold value, the search is stopped when the update of vectors is not performed during two rotations along the spiral.

SUMMARY

An embodiment of the present invention relates to a motion vector extraction method and apparatus which is capable of improving accuracy through a process of detecting a plurality of motion vector candidates through a sub-sampling video search, while a sub-sampling video is used. The sub-sampling video search method is a new multi-step spiral motion search method which is obtained by combining a spiral motion search and the use of a plurality of extensible templates.

In one embodiment, a motion vector extraction method includes: deciding on a search start position in an original video and performing a spiral motion search; and determining whether or not to perform a search in a sub-sampling video, during P picture search.

In the determining of whether or not to perform the search, whether or not to perform the search in the sub-sampling video may be determined by the unit of three pictures including P picture, B picture, and B picture.

The determining of whether or not to perform the search may include: calculating a standard deviation between X and Y components of a motion vector calculated whenever the P picture search is completed; comparing the calculated standard deviation with a predetermined threshold value; and performing motion search in the sub-sampling video, when the standard deviation is smaller than the threshold value.

The motion vector extraction method may further include not performing motion search in the sub-sampling video until the next P picture search and B picture search within the P picture, when the standard deviation is larger than the threshold value.

The sub sampling video may be a video of which the resolution is lowered to ½ of the length and width of the original video.

The motion vector extraction method may further include dividing a 16*16 pixel block of the original video into 8*8 pixel blocks; forming 13 kinds of templates for the 16*16 pixel block; and using 13 kinds of motion vectors calculated from the templates as candidate vectors when the search start position is decided during the original video search, In another embodiment, a motion vector extraction apparatus includes: a search determination unit configured to decide a search start position in an original video and perform spiral motion search; and a search range decision unit configured to decide whether or not to perform search in a sub-sampling video during P picture search.

The search range decision unit may include: a standard deviation calculator configured to calculate a standard deviation between X and Y components of a motion vector calculated whenever the P picture search is completed; and a standard deviation comparator configured to compare the calculated standard deviation with a predetermined threshold value. When the standard deviation is smaller than the threshold value, the search determination unit may perform motion search in the sub-sampling video.

BRIEF DESCRIPTION OF THE DRAWINGS

The above and other aspects, features and other advantages will be more clearly understood from the following detailed description taken in conjunction with the accompanying drawings, in which.

DESCRIPTION OF SPECIFIC EMBODIMENTS

Hereinafter, embodiments of the present invention will be described with reference to accompanying drawings. However, the embodiments are for illustrative purposes only and are not intended to limit the scope of the invention.

Although terms like a first and a second are used to describe various elements, the elements are not limited to the terms. The terms are used only to discriminate one element from another element. For example, a first component may be referred to as a second component, and the second component may be referred to as the first component, without departing from the scope and spirit of the invention. Terms such as and/or include any item among combinations of a plurality of related items or the plurality of related items.

It will be understood that when an element is referred to as being "connected" or "coupled" to another element, it can be directly connected or coupled to other intermediary elements.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise", "comprising", "have" and/or "having", when used herein, specify the presence of stated features, integers, steps, operations, elements, and/or components, but do not preclude the presence or addition of one or more other features, integers, steps, operations, elements, components, and/or groups thereof.

Furthermore, terms such as " . . . part", " . . . unit", and " . . . module" mean a unit which processes one or more functions or operations, and may be implemented by hardware, software, or a combination of hardware and software.

When it is determined that a specific description for the related known technology unnecessarily obscures the purpose of the present invention, the detailed descriptions thereof will be omitted.

Figure 1:
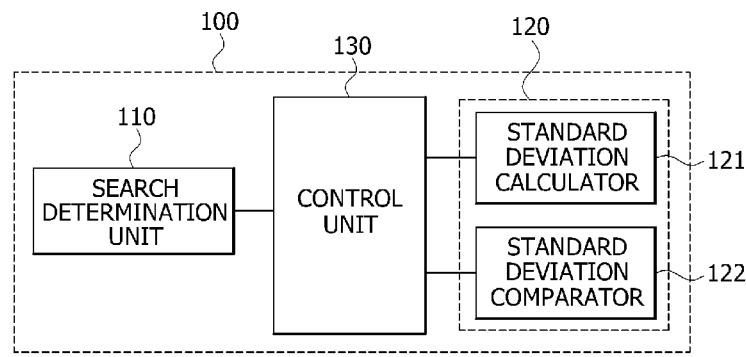
FIG. 1 is a block configuration diagram of a motion vector extraction apparatus in accordance with an embodiment of the present invention.

FIG. 1 is a block configuration diagram of a motion vector extraction apparatus in accordance with an embodiment of the present invention. Referring to FIG. 1, the motion vector extraction apparatus 100 includes a search determination unit 110, a search range decision unit 120, a standard deviation calculator 121, a standard deviation comparator 122, and a control unit 130.

According to the advancement of technology represented by H.264 or demand for high resolution represented by HDTV, the computation amount of video coding is increasing day by day. Therefore, much research has been conducted on the reduction of computation amount for motion search which occupies the majority of computation amount. The spiral motion search method has been improved to an effective method. However, the spiral motion search method exhibits an extreme reduction of accuracy in a specific video, which is caused when an actual search is limited to a part of the search range.

Since the spiral motion search method has a small computation amount, the spiral motion search method is mainly used as a search method of a software encoder. However, the spiral motion search method may significantly degrade the accuracy depending on videos. In the spiral motion search method, the computation amount is minimized by stopping a search according to a predetermined rule. However, this may have a bad effect. For example, when the search is trapped at a local optimal point, it may not approach an optimal point in a large area. The multi-step search method has a disadvantage in terms of the reduction in computation amount, but an extreme degradation of accuracy does not occur. Therefore, the multi-step search method is widely used as a search method of a hardware encoder. However, in a video in which most of motions are constant, the accuracy may be easily degraded in comparison with the spiral search method.

In accordance with the embodiment of the present invention, weak points of the two representative methods may be overcome by a proper combination of the two methods. Specifically, while a sub-sampling video is used, a method of detecting a plurality of motion vector candidates through a sub-sampling video search is used to solve the problem. The method is a new multi-step spiral motion search method which is obtained by combining a spiral motion search and the use of a plurality of extensible templates. Accordingly, the accuracy may be improved while the computation amount is maintained at the same level as the existing high-speed search method.

The search determination unit 110 is configured to decide a search start position in an original video and perform a spiral motion search. The search range decision unit 120 is configured to decide whether or not to perform a search in a predetermined area, for example, a sub-sampling video during a P picture search.

The standard deviation calculator 121 is configured to calculate a standard deviation between X and Y components of a motion vector calculated whenever the P picture search is completed, and the standard deviation comparator 122 is configured to compare the calculated standard deviation with a predetermined threshold value. The control unit 130 is configured to control the search unit 110, the search range decision unit 120, the standard deviation calculator 121, and the standard deviation comparator 122.

In accordance with the embodiment of the present invention, the performance of the spiral motion search method may be improved by using a sub-sampling video. In the spiral motion search method, since only a specific region of a video is searched, the number of search points may be minimized. However, when the estimation of a search start position fails, the video quality is significantly degraded, and the computation amount may be significantly increased.

In order to overcome such a problem, the search range may be widened by setting a stop condition where the search is difficult to stop. In this case, however, since the computation amount is significantly increased, the spiral motion search method may lose its advantage.

Accordingly, as the multi-step search method for expanding a search range without increasing a computation amount, a new spiral search method is proposed. In the spiral search method, whether or not to perform a sub-sampling video search is adaptively switched at a P picture period.

The degradation of accuracy in a sub-sampling video, which is a problem of the multi-step motion search method, may be overcome by the use in combination with a plurality of extensible templates and the utilization of a motion search result of another block, which has temporal and spatial correlations, as a candidate of a search start position.

The switching of the sub-sampling video search is performed as follows. When the sub-sampling video search is performed, the search is doubly performed with the original video search. Therefore, the computation amount is increased. When the video quality is sufficiently maintained even by the conventional method, the sub-sampling video search does not need to be performed in a video in which search is easily performed.

Therefore, whether or not to perform the sub-sampling video search is decided by the unit of three pictures, that is, P, B, and B pictures such that the use of the search is adaptively switched. Whenever a P picture search is completed, a standard deviation between X and Y components of the calculated motion vector is calculated.

Since the proposed method is based on the spiral motion search method, motions of surrounding blocks or motions of temporal blocks are referenced as estimation vectors. At this time, when the standard deviation is small, it means that only similar estimated vectors are acquired. When another motion is partially contained, it is impossible to deal with the motion. Reversely, when the standard deviation increases, estimated vectors are acquired in a plurality of directions such that a plurality of places distributed in a wide area may be searched. Therefore, in the proposed method, when the standard deviation is small, the sub-sampling video is used to search a wide range. When the sum of standard deviations is equal to or larger than the threshold value, the sub-sampling video search is omitted during the next P picture search and the B picture search to the next P picture. The threshold value is set to 40 which was experimentally acquired.

Figure 2:
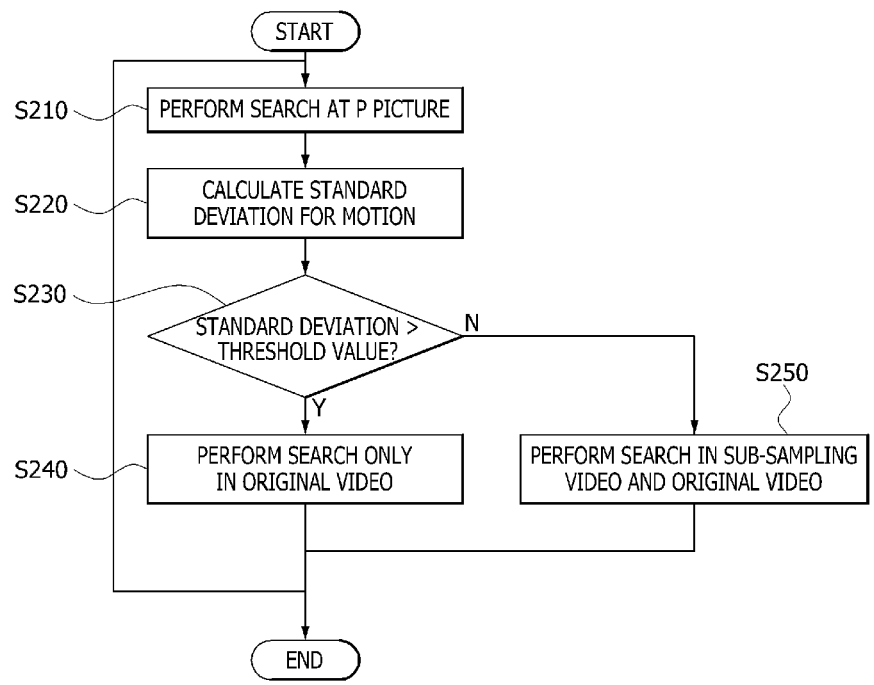
FIG. 2 is a flow chart showing a process of switching a video search to which sub sampling of the motion vector extraction apparatus is applied in accordance with the embodiment of the present invention.

Referring to FIG. 2, a search at a P picture is performed at step S210, a standard deviation for motions is calculated at step S220, and the standard deviation is compared with the threshold value at step S230. When the standard deviation is larger than the threshold value, the search is performed only in an original video, at step S240. When the standard deviation is smaller than the threshold value, the search is performed in a sub-sampling video and the original video. Here, when the standard deviation is larger than the threshold value, the sub-sampling video search may not be performed until the B picture search of the next P picture.

In accordance with the embodiment of the present invention, the sub-sampling video is set as follows. As described above, when the resolution is reduced, the number of search points may be decreased, and the computation amount may be reduced. However, when the resolution is significantly reduced, the details of the video may be broken to thereby reduce the accuracy. In the conventional multi-step search method, the length and width resolution is reduced to ¼ to the maximum. However, in this embodiment based on the spiral motion search method, only a part of the search range is searched, unlike the conventional multi-step search method. Therefore, since the reduction rate of computation amount is larger than in the conventional multi-step search method, the resolution does not need to be significantly reduced. Accordingly, the length and width of a sub-sampling video may be set to ½ of the length and width of an original video such that the sub-sampling video as a whole has a resolution corresponding to ¼ of the resolution of the original video.

In accordance with the embodiment of the present invention, the template may be extended during the sub sampling video search. During the sub sampling video search, when the resolution is reduced, it may cause a reduction of accuracy. Therefore, when blocks are compared, the template is extended to the surroundings. As the template is extended, even the pixels around the motion search target block are compared. Accordingly, the accuracy is improved.

Figure 3:
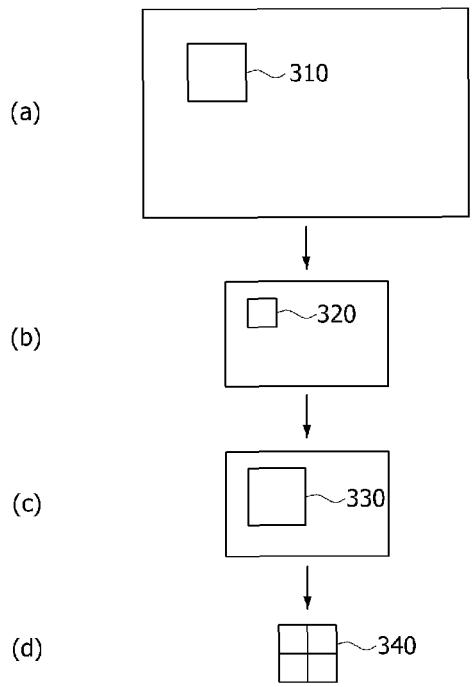
FIG. 3 is a diagram illustrating a sub-sampling video and search templates of the motion vector extraction apparatus is applied in accordance with the embodiment of the present invention.

When the template is simply extended to the surroundings, duplication occurs in the comparison computation, and the computation amount increases. Therefore, referring to FIG. 3, a sub-sampling video (b) is generated from an original video (a) including a 16×16 pixel block 310. The sub-sampling video (b) has a length and width corresponding to ½ of the length and width of the original video (b) and includes an 8×8 pixel block 320. The sub-sampling video (b) is divided into 16×16 pixel blocks, and a motion is calculated by the unit of pixel block. Accordingly, the motion search corresponding to four blocks of the original video is simultaneously performed. Therefore, the template extension may be implemented without duplication of the comparison computation.

Figure 4:
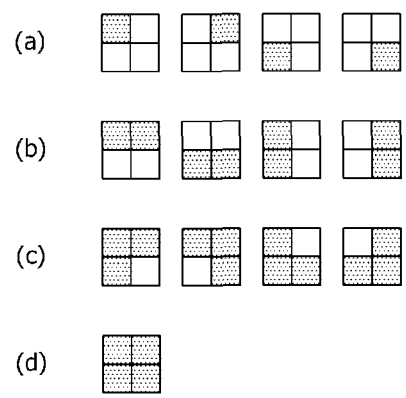
FIG. 4 is a diagram illustrating 13 kinds of templates obtained by combining 8×8 pixel blocks in the motion vector extraction apparatus is applied in accordance with the embodiment of the present invention.

When the extended template overlaps the boundary line between objects of other motions in the video, the accuracy may be reduced. Therefore, a plurality of templates extended in different directions may be installed so as not to overlap the boundary line. Specifically, the 16×16 pixel block 330 is divided into four 8×8 pixel blocks 340. The four 8×8 pixel blocks 340 may be combined to construct 13 kinds of templates as illustrated in FIG. 4.

FIG. 4A illustrates a one block template, FIG. 4B illustrates a two block template, FIG. 4C illustrates a three block template, and FIG. 4D illustrates a four block template. During comparison, a motion of which the coincidence is the highest among the templates is detected. The 13 kinds of motion vectors obtained from the result are used as candidate vectors which are to be designated as a search start position during the original video search.

In accordance with the embodiments of the present invention, the motion vector extraction method and apparatus may improve accuracy through a process of detecting a plurality of motion vector candidates through a sub-sampling video search, while a sub-sampling video is used. The sub-sampling video search method is a new multi-step spiral motion search method which is obtained by combining a spiral motion search and the use of a plurality of extensible templates.

Furthermore, the motion vector extraction method and apparatus may performs a spiral motion search in a sub-sampling video to expand the search range without increasing the computation amount, and may improve the accuracy through the extension of templates. Furthermore, the candidate vectors may be selected in stages to suppress the increase of computation amount. Accordingly, the computation amount is suppressed to the same computation amount as the conventional method, and the video quality may be improved.

Furthermore, the detailed descriptions of a specific apparatus configuration diagram, a common platform technology such as embedded system or O/S, and an interface standardization technology such as a communication protocol or I/O interface are obvious to those skilled in the art to which the present invention pertains. Therefore, the detailed descriptions are omitted herein.

The motion vector extraction method in accordance with the embodiment of the present invention may be embodied in program instruction forms which may be executed through a variety of computer units, and written in computer-readable media. That is, the recording medium may include a computer-readable recording medium configured to store a program which causes a computer to execute the respective steps.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A motion vector extraction method comprising: deciding on a search start position in an original video and performing a spiral motion search; and determining whether or not to perform the search in a sub-sampling video, during P picture search, wherein the determining of whether or not to perform the search comprises: calculating a standard deviation between X and Y components of a motion vector calculated whenever the P picture search is completed; comparing the calculated standard deviation with a predetermined threshold value; and performing motion search in the sub-sampling video, when the standard deviation is smaller than the threshold value.

2. The motion vector extraction method of claim 1, wherein, in the step of determining whether or not to perform the search in the sub-sampling video is determined by the unit of three pictures including P picture, B picture, and B picture.

3. The motion vector extraction method of claim 1, further comprising not performing motion search in the sub-sampling video until the next P picture search and B picture search within the P picture, when the standard deviation is larger than the threshold value.

4. The motion vector extraction method of claim 1, wherein the sub sampling video is a video of which the resolution is lowered to ½ of the length and width of the original video.

5. The motion vector extraction method of claim 1, further comprising:
    dividing a 16*16 pixel block of the original video into 8*8 pixel blocks;
    forming 13 kinds of templates for the 16*16 pixel block; and
    using 13 kinds of motion vectors calculated from the templates as candidate vectors when the search start position is decided during the original video search.

6. A motion vector extraction apparatus comprising: a search determination unit configured to decide a search start position in an original video and perform spiral motion search; and a search range decision unit configured to decide whether or not to perform the search in a sub-sampling video during P picture search, wherein the search range decision unit comprises: a standard deviation calculator configured to calculate a standard deviation between X and Y components of a motion vector calculated whenever the P picture search is completed; and a standard deviation comparator configured to compare the calculated standard deviation with a predetermined threshold value, and when the standard deviation is smaller than the threshold value, the search determination unit performs motion search in the sub-sampling video.

* * * * *